United States Patent [19]

Merlen et al.

[11] 3,900,265

[45] Aug. 19, 1975

[54] LASER SCANNER FLAW DETECTION SYSTEM

[75] Inventors: Monty M. Merlen, Stamford; Peter H. Nichols, Cheshire, both of Conn.

[73] Assignee: Intec Corporation, Norwalk, Conn.

[22] Filed: Mar. 8, 1974

[21] Appl. No.: 449,247

[52] U.S. Cl. ............. 356/200; 235/151.3; 250/572; 356/237

[51] Int. Cl.$^{2}$ .......................................... G01N 21/32

[58] Field of Search .................... 235/151.3, 151.35; 250/572; 356/158, 160, 200, 237, 238, 239; 350/6, 7, 285, 190

[56] References Cited

UNITED STATES PATENTS 3,781,531 12/1973 Baker.......................... 235/151.3

*Primary Examiner*—Ronald L. Wibert
*Assistant Examiner*—Richard A. Rosenberger
*Attorney, Agent, or Firm*—Joseph Levinson, Esq.

[57] ABSTRACT

A laser scanner flaw detection system is provided with improved optics in the scanner and receiver for imaging the laser beam on a detector from the material being examined. A center-to-side scanning pattern is illustrated to provide complete scanning of the material as well as simplifying the provision of accurate scan position information. The system includes circuitry for preventing errors in quantizing flaws because of scanning velocity changes and flaw amplitude fluctuations on subsequent scans of the same flaw.

21 Claims, 12 Drawing Figures

SCAN POSITION AND TIME VS FLAW GATE INTERVAL

| FLAW GATE INTERVAL | GATE LEAD | GATE STRETCH |
|---|---|---|
| A | 1.5 m.sec. | 3.0 m.sec. |
| B | 2.0 m.sec. | 4.0 m.sec. |
| C | 3.0 m.sec. | 6.0 m.sec. |
| D | 4.0 m.sec. | 8.0 m.sec. |

LASER SCANNER FLAW DETECTION SYSTEM

BACKGROUND OF THE INVENTION

This invention relates to a laser scanner flaw detection system, and more particularly to such a system having improved optics for imaging the laser beam on the detector and reducing the effects of external ambient light conditions. The system utilizes center-to-side active scanning to accomplish complete scanning of the surface of the material being examined, which simplifies the obtaining of scan position information. The flaw detection system further includes means for preventing multiple flaw indications of a single flaw, whether the flaw occurs near the center of scan where the beam is moving rapidly, or near the edge of the scan where the beam is moving more slowly.

In U.S. Pat. No. 3,781,531, entitled Flaw Detection System Utilizing a Laser Scanner, granted Dec. 25, 1973, which is assigned to the assignee of the present invention, a laser scanner flaw detection system is described for detecting flaws in the surfaces of material in the form of continuously moving webs of material, or in various piece parts of similar or different materials. In the aforesaid system the laser beam is repetitively scanned across the surface of the material being examined, with the light being reflected therefrom, or transmitted therethrough, depending on the characteristics of the material being examined. The transmitted or reflected light is received by a photomultiplier detector. At any instant of time during the scan, the photomultiplier output varies with the reflectivity, transmissivity, or scattering properties of the spot upon which the laser beam is impinging. Deviations from normal variations of light from the material being examined provides a means for indicating material flaws. It is important to accurately control the angular relationships between the impinging scanning laser beam on the surface of the material being scanned and the reflected, transmitted, or scattered light from or through the surface that is imaged across the photomultiplier tube. Also, it is desirable to restrict the photomultiplier field of view to the area of the material across which the laser beam is scanning to minimize ambient room light pickup and to maximize flaw signal contrast without resorting to light baffles close to the material surface. The aforesaid patent did not deal with these problems.

In the aforesaid patent, scanning was achieved by moving the laser beam back and forth across the moving material by means of a mirror attached to a sinusoidally driven galvanometer. Useful scan data was derived during the active scan portions at each scan interval corresponding to scanning from one side, for example the left extreme scan position. During the retrace time intervals while scanning was occurring from right to left, scan data was ignored. The phase of the galvanometer drive signal was used to indicate when active scan was in effect, and when detected flaw signals were to be processed. However, it was found that small changes in either the galvanometer characteristics or drive frequency produced errors, and the galvanometer's mirror's angular position did not follow the drive voltage accurately. The position lagged behind, with the amount of the lag being a function of the individual galvanometer, drive frequency, temperature, lubrication, etc. Although various compensation techniques, both mechanical and electrical, could be employed to treat this problem, a simpler, more accurate scan position means was found to be desirable.

Another problem encountered was in the quantizing of the flaws, which was caused by a change in scan velocity versus position of the laser beam as it moved across the material being examined. Since it is desirable for certain applications to count individual flaws on the surface of material, while preventing multiple flaw indications of the same flaw produced by successive scans, the electronic processing must accommodate signals from the same flaw that may be slightly displaced on successive scans. In addition to skewed extended flaws, displacement may be caused by irregularities in the scanning or other system anomalies. In the aforesaid patent, a fixed timing gate signal was provided to lead and lag the detected flaw, and if it appeared within the same gate signal upon successive scans the flaw was not recounted. However, the timing of the fixed gate was the same in the center as on the edges, and did not deal with the problem of the change in the scanning velocity of the laser beam from center to side. Thus, if a timing gate of fixed interval in the center of the scan is set to accept a fixed amount of flaw displacement, the same gate, when it gets to the edges, can only accept a lesser displacement. Conversely, if the gate timing is set to accept a particular amount of flaw movement on the sides and the same gate is utilized in the center of the scan, it may be so wide that an adjacent flaw separated by a significant distance from the initial flaw may be contained within the gate interval, and therefore would not be detected. Accordingly, it would be desirable to provide flaw gates of variable time which are shorter in duration in the center of the scan and longer in duration at the edges of the scan.

To further insure that the same flaw is not repetitively counted, it would be desirable to provide a multiple scan memory flaw quantizer which requires the initial flaw to disappear for a plurality of lines before a new flaw in that same position is again counted. It would also be desirable to insure that the initial flaw did not disappear due to beam jitter or other system anomalies which could produce a smaller amplitude from the same flaw on subsequent scans.

Accordingly, it is an object of this invention to provide a new and improved laser scanner flaw detection system which overcomes the aforesaid problems.

An object of this invention is to provide a new and improved laser scanner flaw detection system which overcomes ambient light problems without the use of structural hoods and other types of structures designed to prevent ambient light changes on the surface of the material being examined.

A further object of this invention is to provide a new and improved laser scanner flaw detection system which provides accurate scan position information for eliminating errors associated with faulty scan position indication.

Another object of this invention is to provide a new and improved laser scanner flaw detection system which eliminates errors in quantizing due to flaws occuring at different positions of the material being scanned in which the scanning velocity changes in accordance with position on the material.

Still another object of this invention is to provide a new and improved laser scanner flaw detection system which eliminates errors in quantizing flaws due to flaw amplitude fluctuations on subsequent scans of the same flaw.

SUMMARY OF THE INVENTION

In carrying out this invention in one illustrative embodiment thereof, a laser beam is successively scanned by a scanning means across a surface of material being examined, and a detector means is positioned for receiving radiation applied by the laser beam from the surface for producing a signal in response to the intensity of the radiation received from the surface. Optical means are provided for the scanning means and the detector means for precisely imaging the scanner on the detector means and controlling the laser beam applied to the surface of the material being analyzed. Beam position indicator means are also provided for very accurately determining the position of the laser beam on the surface of the material being examined. Signals from the detector means are applied to a flaw amplitude discriminator circuit, which passes flaw signals greater than a predetermined amplitude to a multiple scan memory flaw quantizer. A variable flaw gate control circuit which has scan position information applied thereto is coupled to the variable scan memory flaw quantizer to control and provide a variable time flaw gate signal in the quantizer in accordance with the position of the scan. Feedback from the multiple scan memory flaw quantizer is applied to the flaw amplitude discriminator for reducing the discriminator threshold level. Correspondingly, the amplitude required for detecting the same flaw on subsequent scans is reduced. A new flaw at the same scan position will be counted from the multiple scan memory flaw quantizer only after the number of scans in the multiple scan memory flaw quantizer is exceeded without the reappearance of the same flaw.

DESCRIPTION OF THE PREFERRED EMBODIMENTS

Figures 1, 2:
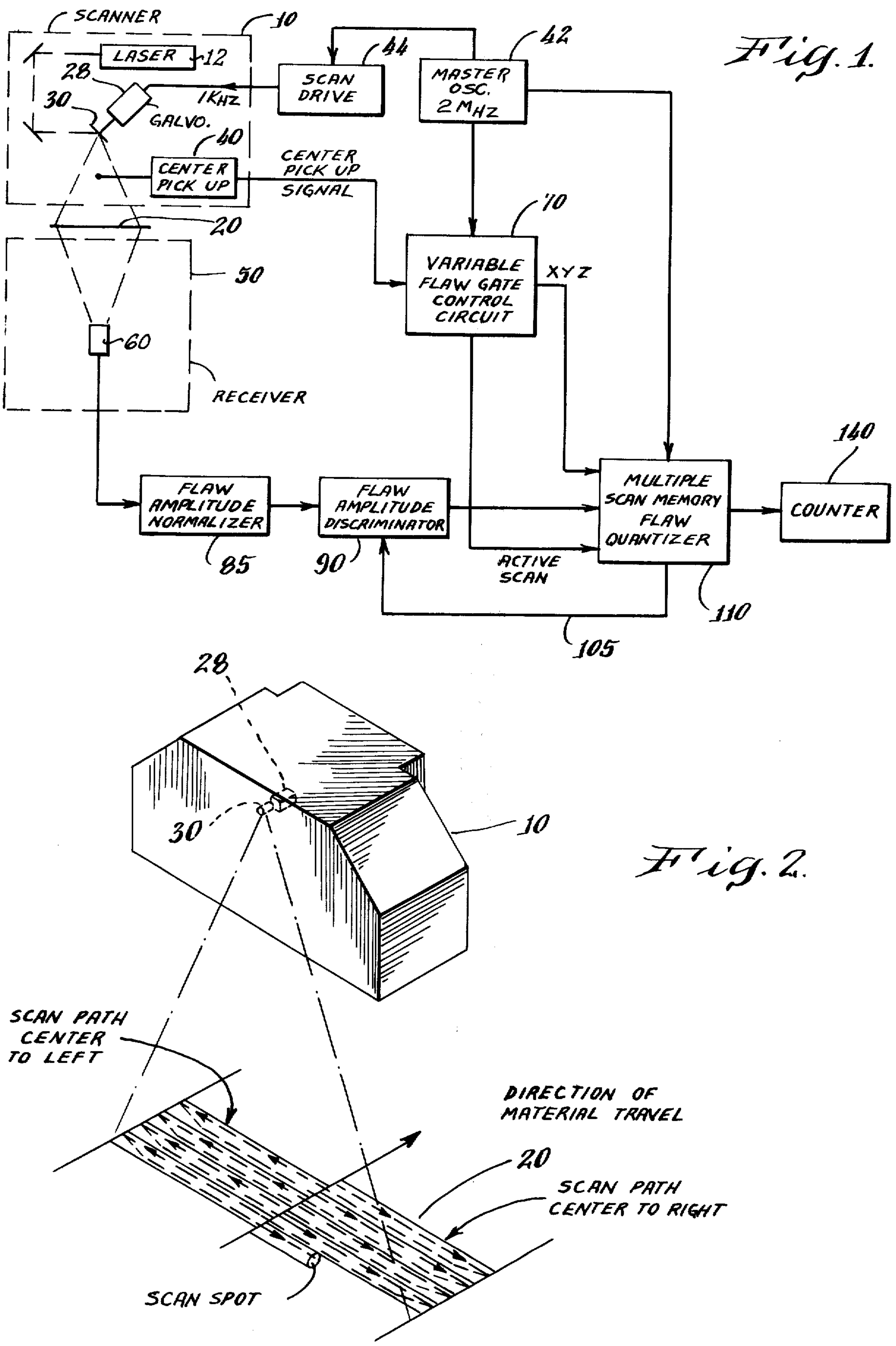
FIG. 1 is a schematic block diagram of one form of the new and improved laser scanner flaw detection system embodied in this invention.
FIG. 2 is an isometric view of the scanner employed in this invention, illustrating one form of scan pattern which may be utilized in the present invention.

Referring now to FIG 1, a scanner 10 includes a conventional laser 12 such as helium neon or argon ion gas lasers, or any other suitable type which is capable of generating a laser beam of monochromatic light in a predetermined spot size. The laser beam is scanned by a galvanometer mirror 30 successively across a web of material 20 which is continuously moving in a direction perpendicular to the plane of the drawing. Scanning is achieved by utilizing a signal from a master oscillator 42 (e.g., 2 MHz) which is applied to a scan drive circuit 44 which supplies a suitable sinusoidal drive signal, e.g., 1 KHz, to a high-speed galvanometer 28 which drives in pivotal fashion the galvanometer mirror 30. The 1 KHz scan signal is derived from the 2 MHz oscillator, and provides 1,000 scans per second. The galvanometer mirror 30 deflects the laser beam from the laser 12 and causes it to scan back and forth across the surface of the material 20. Scanning in the orthogonal direction to create a raster is accomplished automatically by the movement of the web of material 20.

FIG. 2 shows the preferred form of scan pattern employed in the present invention. The active scan region is from center-to-right and center-to-left, indicated by the dashed lines containing the arrows, with the retrace intervals shown with only dashed lines. In prior systems, side-to-side scans were utilized, with successive retrace intervals being blanked out. Although side-to-side scanning may be utilized in the present invention with a blank retrace, the center-to-side scan offers advantages in deriving position information for the electronic processing circuits. It has been found that the phasing of the galvanometer drive signal versus scan position of the laser beam did not accurately define the scan region because small changes in either the galvanometer characteristics or the drive frequency caused corresponding errors. As will be apparent in the following description, a simple, accurate center pickup is made possible utilizing the center-to-side scan concept.

Figures 3, 4:
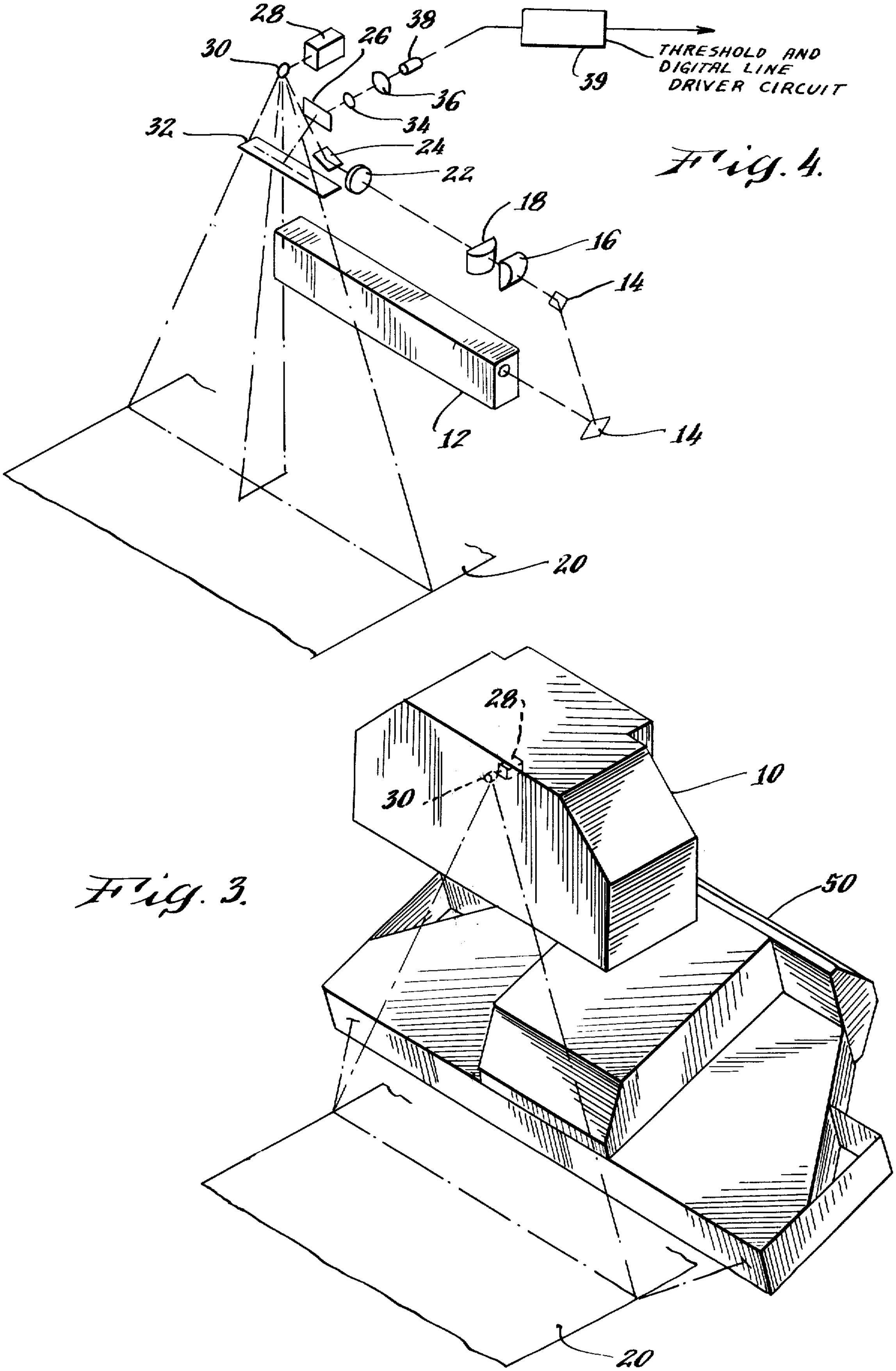
FIG. 3 is an isometric view illustrating a system configuration for reflective examination of surfaces which is one form of operation that may be utilized with the present invention.
FIG. 4 is an isometric view of the scanner optical system which may be employed in the present invention.

FIG. 1 shows a transmissive type system in which the material 20 is translucent, with the scanned laser beam being passed through the material 20 to a receiver 50 having a detector 60 in the form of a photomultiplier tube. At any instant of time during the scan the photomultiplier tube 60 provides an output which is proportional to the transmissivity or refractivity of the spot upon which the laser beam is impinging. Flaws occurring on the surface of the material 20 being examined change the output of the photomultiplier tube due to the transmissive or refractive properties of the material being examined, providing a means for indicating flaws on the surface. The invention is equally applicable to a reflective type system, where the output of the photomultiplier tube 60 would be proportional to the reflectivity or refractivity of the spot upon which the laser beam is impinging. Whether a transmissive or a reflective mode is utilized would depend upon the application and the material being examined. FIG. 3 illustrates a system configuration for operating in the reflective mode.

FIG. 4 shows a preferred form of optical system for the scanner 10 of FIG. 1. The laser beam from the laser 12 is reflected from a pair of folding mirrors 14 which are provided to permit a compact design for the scanner as illustrated in FIGS. 3 and 4. The laser beam is passed from the folding mirrors 14 through a cylindrical lens 16 which is utilized to adjust the spot width along the direction of scan and through a cylindrical lens 18 which adjusts the laser spot along the length perpendicular to the direction of the scan. A fixed spherical lens 22 images laser light passed through the focusing cylindrical lenses 16 and 18 via a mirror 24 and the galvanometer mirror 30 onto the material 20. The distance from the fixed spherical lens 22 to the galvanometer mirror 30 is equal to the focal length of the spherical lens 22 which maintains the spot size on the galvanometer mirror so that it does not vary irrespective of position adjustments of cylindrical lenses 16 and 18. The laser beam from the laser 12 is scanned by the galvanometer mirror 30 across the surface of the material 20 through an angled partially reflective glass window 32. The glass window 32 may be 5–10% reflective and 90–95% transmissive. The reflected portion of the laser beam from the window 32 is reflected by a folding mirror 26 and focused by a focusing lens 34 through an opaque mask 36 with a small, narrow slit opening therein, for example on the order of 0.0015 in. × 0.1 in., to a phototransistor 38. This structure forms the center pickup assembly for obtaining the center position of the scan. Light from focusing lens 34 which passes through the slit in opaque mask 36 falls onto the phototransistor 38 which generates a signal applied to a threshold and digital line driver circuit 39 for producing at the output thereof a center pickup signal.

Figure 5:
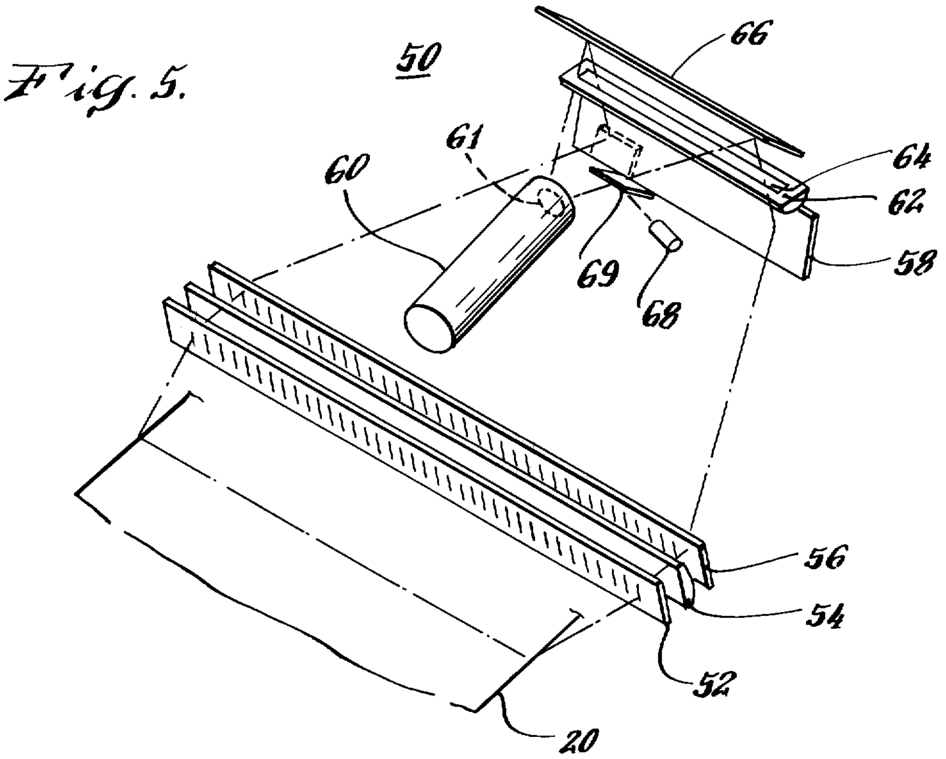
FIG. 5 is an isometric view of the receiver optical system which may be employed in the present invention.

In FIG. 5 a preferred form of optical system is shown for the receiver 50 which can be used in either the transmissive system illustrated in FIG. 1 or the reflective mode of operation illustrated in FIG. 3. The optical system of the receiver as shown in FIG. 5 comprises a pair of back-to-back Fresnel lenses 52 and 56 positioned on each side of a cylindrical lens 54, a mirror 58, a cylindrical lens 62, and a mirror 66, and the photomultiplier tube 60. The Fresnel lens 52 passes reflected, transmitted, or scattered light that reaches its surface from the scanned laser spot on the inspection surface 20, through to cylindrical lens 54 which focuses light in a vertical direction on the cylindrical lens 62 after passing through the second Fresnel lens 56 which, in combination with Fresnel lens 52, bends the light horizontally as well as vertically toward the cylindrical lens 62. The cylindrical lens 54 acts as a vertical aperture stop which determines in the vertical direction the amount of light but not the field of view on the material from which light can be received by the photomultiplier tube. The cylindrical lens 62 may be provided with a mask 64 so that it can act as a vertical field stop which restricts the photomultiplier tube 60 field of view on the material from which light can be received, but will not affect the amount of light received from the laser beam within the PMT field of view. This provides a narrow field of view which restricts room light, but passes all the laser light within the field of view to the PMT 60 from the inspection surface 20. The photomultiplier tube 60 may also be provided with a filter 61 which passes the laser light wavelength of interest but further restricts the effects of ambient light or other stray radiation that may be at different wavelengths. In transmission operation, with the scanner and receiver in line, the optical system as shown in FIG. 5 in effect images the galvanometer mirror on the photomultiplier tube 60. Futhermore, a ray bundle from a point of light on the scan line that passes through the receiver optics is spread across the surface of the photomultiplier tube 60 so that differences in sensitivity across the photomultiplier tube surface drop out. A lamp 68 and a fold-up mirror 69 are also shown, which can be utilized for alignment purposes, which, when used, images the lamp 68 through the receiver optics to form a narrow rectangular area on the inspection surface 20 that defines the receiver field of view.

Figure 6:
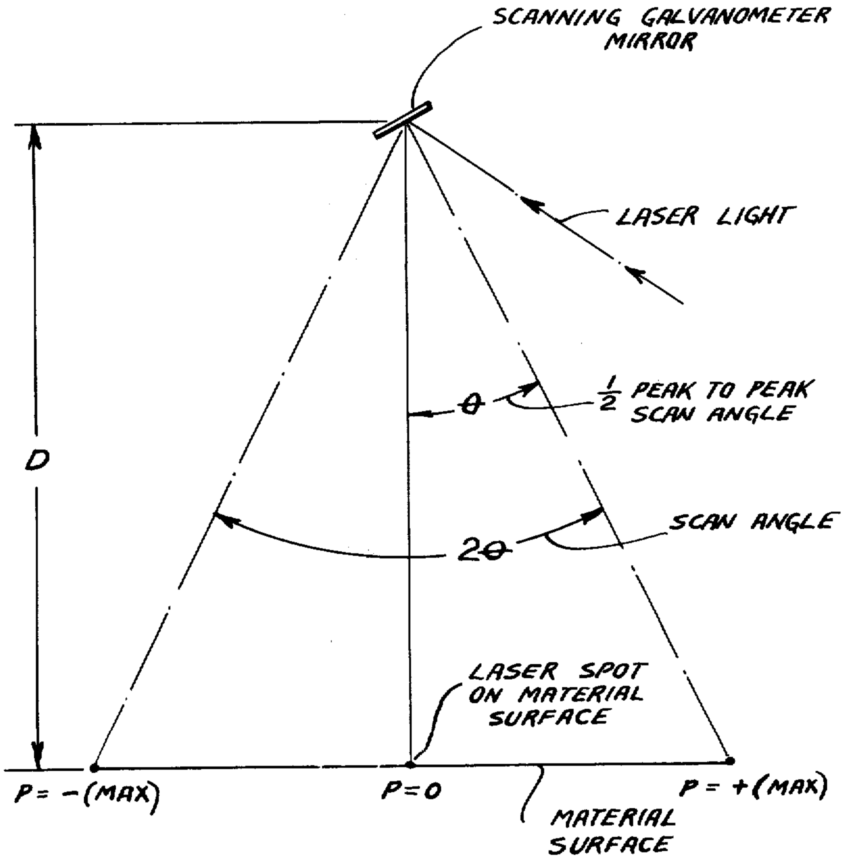
FIG. 6 is a diagram of spot position on a material surface which is utilized to illustrate how the position and velocity of the laser spot on a material being examined is derived.

Before continuing with a description of the electronic processing of the flaw signals derived from the receiver, a discussion of the desired result and the problems encountered in providing such a result will first be discussed. Once a flaw signal is detected by the photomultiplier tube 60, if it passes a certain amplitude it can be counted as a flaw. However, for many applications and quality control programs, it has been found desirable to count the same flaw only once. Thus, if the same flaw exists on a surface, subsequent scans detecting the flaw in the same position should only count it as a single flaw. This result may be achieved electronically by establishing a flaw gate which leads and lags or trails the flaw by a predetermined amount, thus providing what is termed a "guard band" around the flaw, which is stored, and if the flaw occurs on a subsequent scan within the stored guard band, the flaw will not be counted. For a new flaw to be registered, then, the new flaw would have to occur outside the established guard band of the previous flaw. This was accomplished in the aforesaid patent by establishing a fixed time interval flaw gate around each flaw as it occurs along the line of scan. This technique raises a serious problem when a non-linear scan of the surface of material 20 is effected. In using a sinusoidal scan, the beam moves faster in the center of the scan and much slower on the edges of the scan. Thus, with a fixed time interval flaw gate, the scanning distance covered during the flaw gate time interval is greater near the end of the scan than it is near the center of scan. Accordingly, multiple closely spaced separate flaws occurring near the center of the scan falling within the fixed flaw gate timing interval may not be detected as separate flaws and could be counted as a single flaw. If the flaw gate time duration is shortened to eliminate this problem in the center, the flaw gate on the edges would be narrowed, with less distance covered on the material for each flaw gate. This could produce quantizing errors of single flaws near the edges, in that flaw edges of extended oblique flaws on moving material could cause flaw pulse position shifts beyond the flaw gate time limits on subsequent scans of the same flaw. Accordingly, the solution to the problem is to provide a varying width flaw gate whose timing varies with scan position from center to sides of scan to deal with this problem. From the beam scan position diagram shown in FIG. 6 the following expressions can be derived:

$$P = D \tan(\theta \sin(2\pi f t))$$

$$\frac{dP}{dt} = \frac{2\pi f \zeta D \cos(2\pi f t)}{\cos^2(\theta \sin(2\pi f t))}$$

wherein $P$ = position of laser spot on material $D$ = distance of scanning galvanometer mirror above material (inches)

$\theta$ = ½ of peak-to-peak scan angle (radians)

$f$ = scan frequency (sinusoidal scans per second)

$t$ = time (seconds)

$dP/dt$ = velocity (inches per second) of moving laser spot on material.

Figure 7:
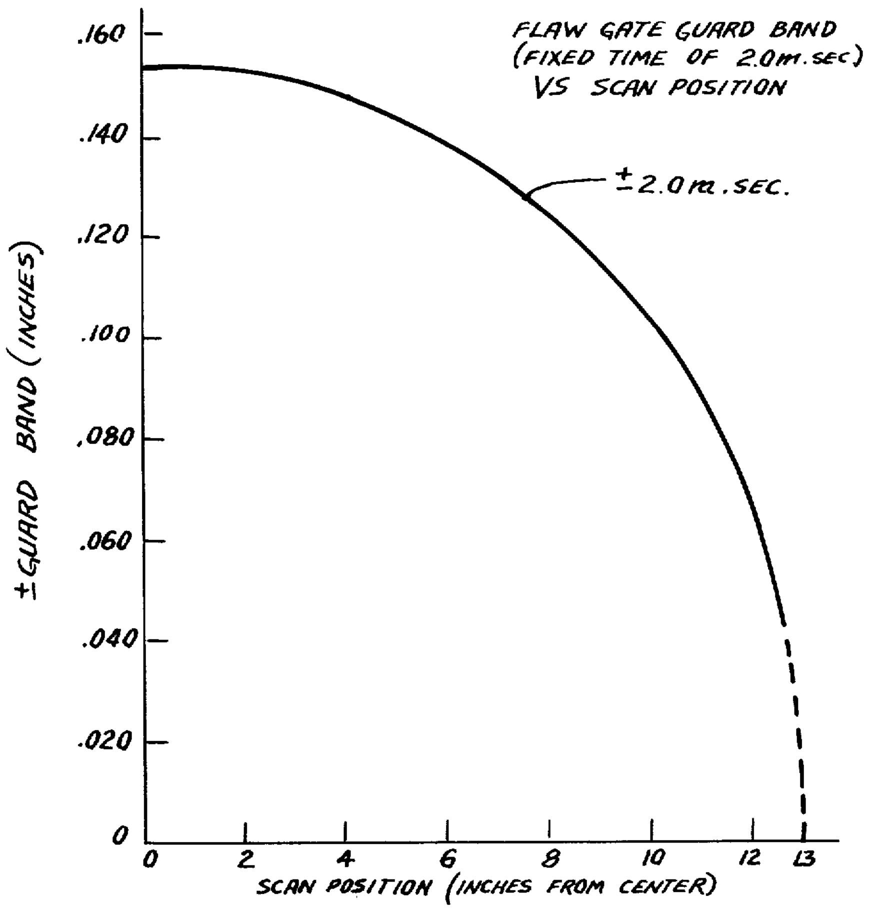
FIG. 7 is a graph of a fixed time flaw gate guard band versus scan position.
Figure 8:
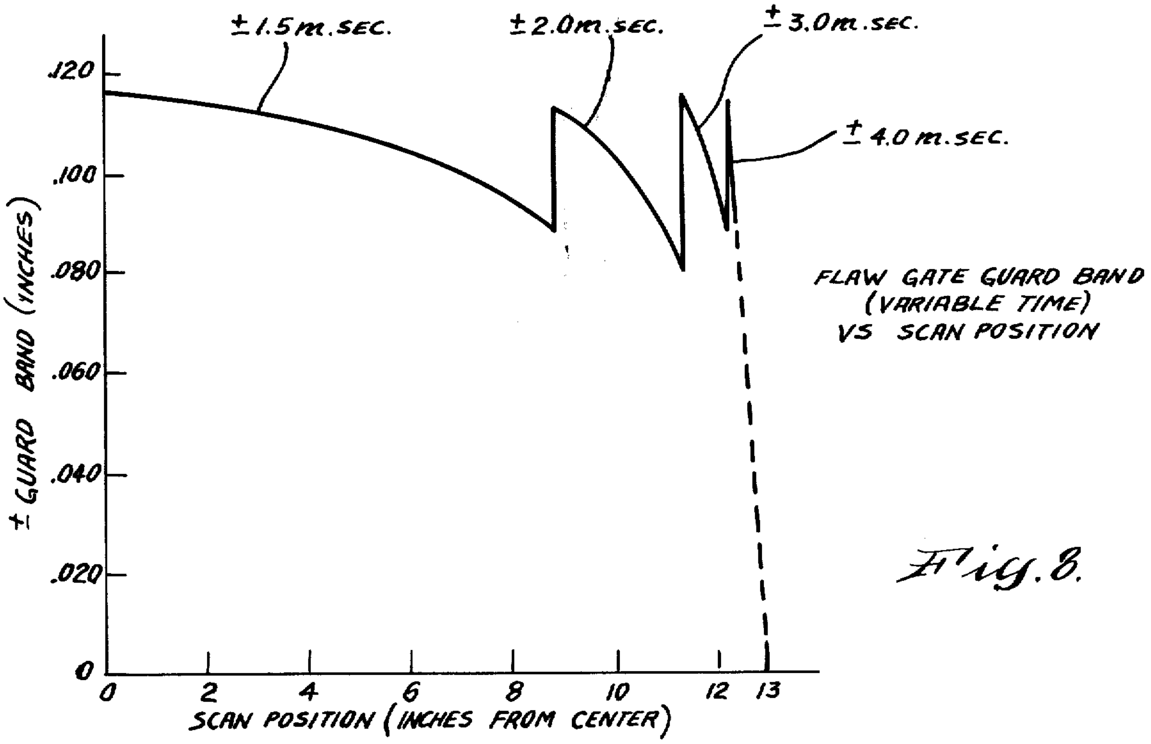
FIG. 8 is a graph of flaw gate guard band (variable time) versus scan position.
Figure 9:
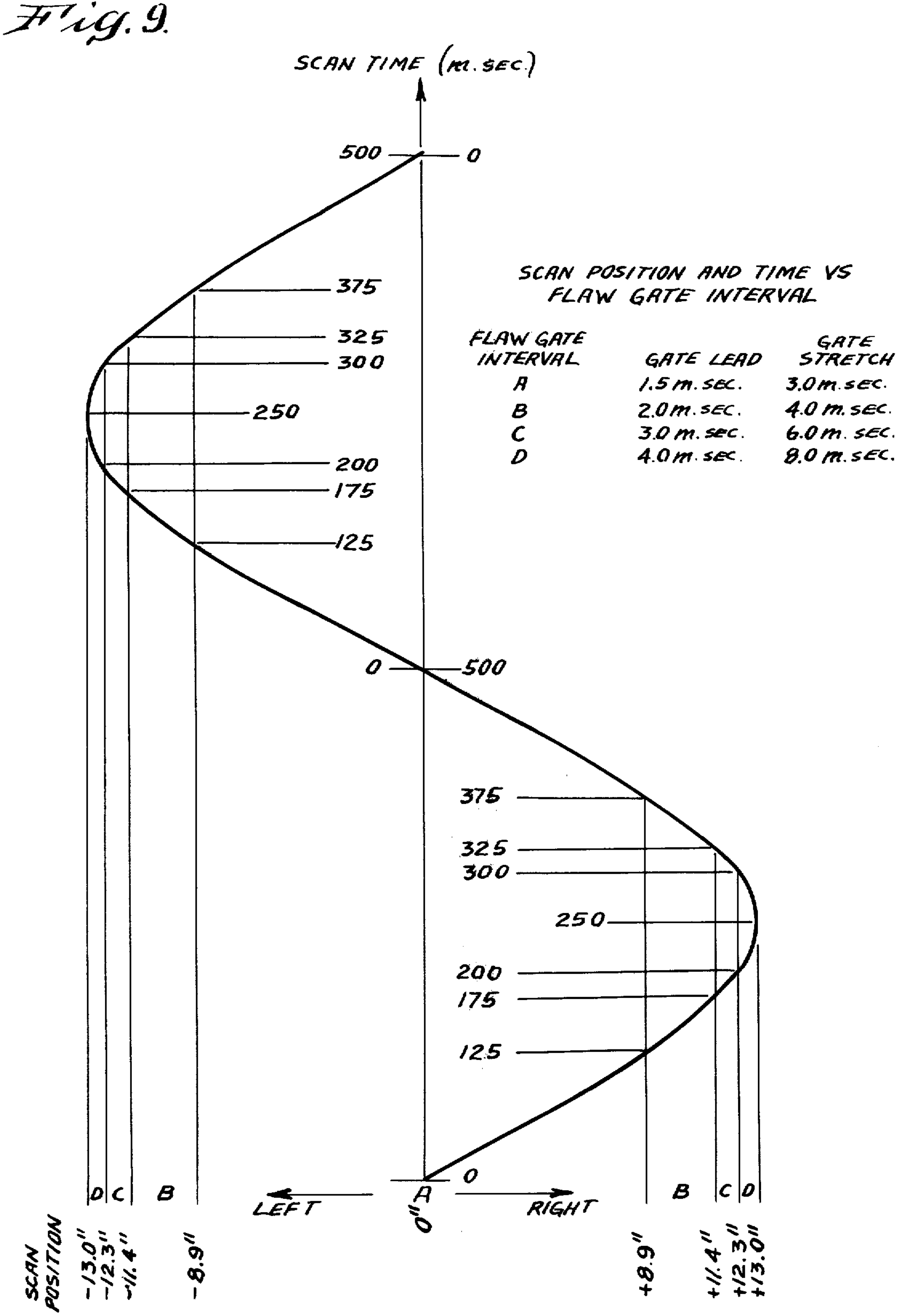
FIG. 9 is a graph of scan position and time versus flaw gate interval.

Given $D$, $\theta$ and $f$, the position $P$ and the velocity $dP/dt$ can be solved to provide scan position and scan velocity versus time information. From the foregoing basic expressions, flaw gate guard band versus scan position can also be evolved, a graph of which is shown in FIG. 7, which has a guard band with a fixed time of 2 microseconds irrespective of scan position. From FIG. 7 the problem is readily seen where the beams covers three times the distance for a fixed time interval in the center than it does when it is a half inch away from the ends of a 26 inch wide scan. FIG. 8 shows a graph of a flaw gate guard band (variable time) versus scan position which approximates the desired results. The guard band varies in time from carrier to the edge of scan, but covers approximately the same distances. With the conditions shown on FIG. 8, the three-to-one variation shown on FIG. 7 is reduced to less than plus or minus 20%. From the graph of FIG. 8 is derived the graph shown in FIG. 9 representing scan time in microseconds versus scan position. One full scan cycle is shown for a scan across material 26 inch wide. It will be apparent that other widths may be scanned, and that the technique described may be utilized in which the time intervals and distances will be proportional to the ones herein chosen for purposes of illustration. The time intervals herein illustrated with respect to a 26 inch scan will be utilized in the rest of the description to illustrate the principles of one aspect of the invention. The scan position is divided into flaw gate intervals A, B, C, and D, the time intervals of which are indicated in microseconds. These intervals are utilized in a variable flaw gate control circuit 70.

Figure 10:
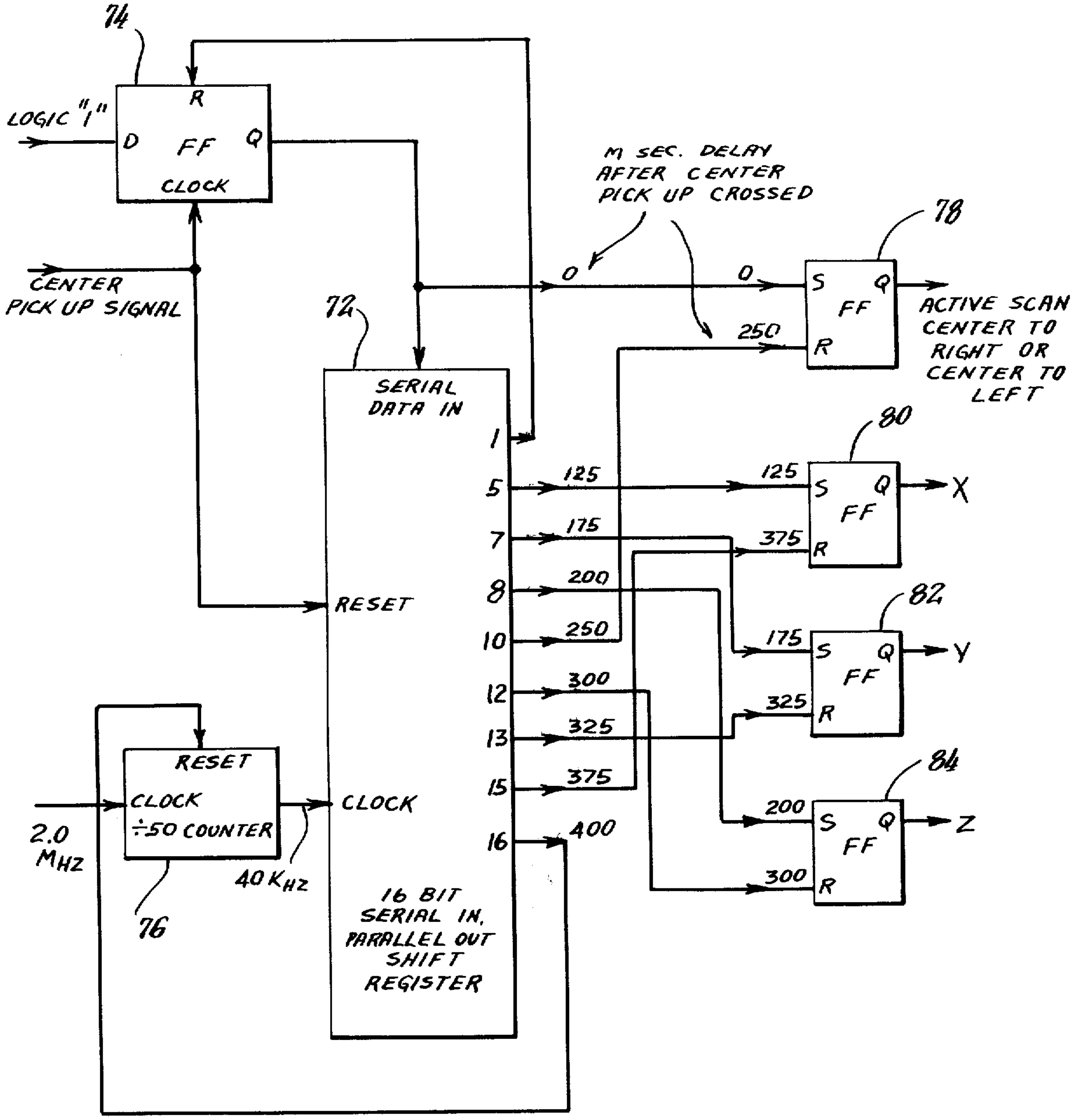
FIG. 10 is a block diagram of the variable flaw gate control circuit of a type which may be utilized in FIG. 1.

FIG. 10 shows one form of variable flaw gate control circuit which may be utilized in the present invention. It is comprised of a D-type flipflop 74, a 16-bit serial-input parallel-output shift register 72, a divide-by-50 counter 76, and set-reset flipflops 78, 80, 82, and 84. It will be observed that the parallel outputs 5, 7, 8, 10, 12, 13 and 15 of the shift register 72 correspond to predetermined time intervals shown on the graph of FIG. 9. A 2 MHz signal is supplied from the master oscillator 42 (FIG. 1) to the divide-by-50 counter 76, providing a 40 KHz clock signal for the shift register 72. The D-type flipflop 74 input is hard wired to a logic 1 level, and its Q output goes to the logic 1 level synchronously with clocking provided from the center pickup assembly 40 (FIG. 1). The center pickup signal is also used to reset the shift register 72. On the occurrence of the center pickup signal from the center pickup assembly 40, flipflop 74 transfers logic 1 data to the data-in terminal of shift register 72, which then transfers the logic 1 input to its first output 25 microseconds later. This output is also supplied to the reset terminal of flipflop 74. This resets flipflop 74 so that it is in condition to receive the next center pickup signal. As the logic 1 data is further shifted once every 25 microseconds in the shift register 72 by the 40 KHz clock pulses from divide-by-50 counter 76, other shift register outputs are applied to the set-reset inputs of flipflops 78, 80, 82, and 84 in accordance with the time delays shown. For example, output terminal 5 of the shift register 72 is coupled to the set terminal of flipflop 80, and output terminal 15 of the shift register 72 is coupled to reset terminal of flipflop 80. Accordingly, the Q output of flipflop 80 goes to logic 1 on the occurrence of logic 1 output from terminal 5 125 microseconds after the center pickup is crossed and goes to logic 0 when logic 1 data is applied from the terminal 15 of the shift register 72 to the reset terminal of the flipflop 80 375 microseconds after the center pickup is crossed. This produces a logic 1 output signal from the Q output of flipflop 80 during the scan interval designated X, which equals the scan intervals $B + C + D$ indicated on FIG. 9. Flipflop 78 produces logic 1 output signals at its Q output covering active scan intervals from center to right or center to left of scan, and logic 0 output signals during side to center retrace time intervals. Flipflop 82 produces a Y output which is equal to the C + D scan intervals, and flipflop 84 produces a Z output equal to the D scan interval as shown on FIG. 9. 400 microseconds after the center pickup is crossed, data-out terminal 16 of the shift register 72 goes to logic 1. This resets the divide-by-50 counter, and reset is held until the next center pickup signal occurs. This reset data-out terminal 16 of shift register 72 to logic 0, which removes the reset input to divide-by-50 counter 76, enabling the start of the nexr center-to-side active scan interval. The X, Y, and Z outputs from flipflops 80, 82, and 84 are utilized on FIG. 12 to time the flaw gates in a one scan delay variable width flaw gate 112. The Q output from flipflop 78 is also utilized to control the active scan region timing of the multiple scan memory flaw quantizer 110.

Returning now to FIG. 1, signals generated by the detector 60 and the receiver 50 are applied to a flaw amplitude normalizer circuit 85, which functions to normalize the flaw signals such that signals produced by the same type of flaws have the same amplitude no matter whether they occur in the center of the scan or toward the edge of the scan. This type of circuit is shown in the aforesaid patent.

Figure 11:
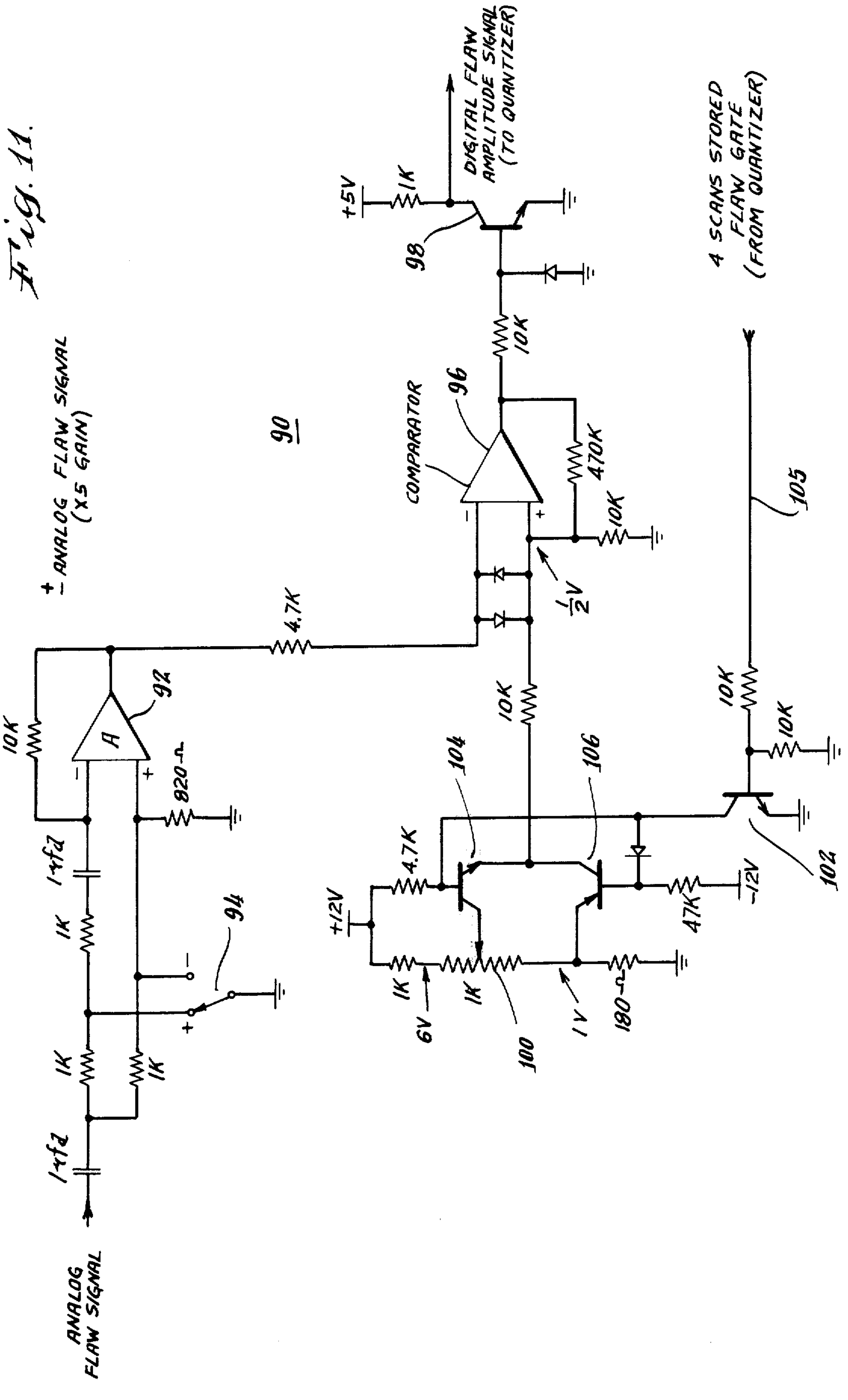
FIG. 11 is a schematic diagram of the flaw amplitude discriminator circuit which may be utilized in the system shown in FIG. 1.

Normalized flaw signals from the flaw amplitude normalizer 85 are coupled to a flaw amplitude discriminator circuit 90 which functions to pass only flaw signals above a predetermined threshold level. This level is set to distinguish true flaw signals from system noise and other system anomalies. FIG. 11 shows one form of flaw amplitude discriminator circuit 90 with illustrative component values which may be employed in the present invention. Analog flaw signals from the flaw amplitude normalizer 85 are applied through a flaw polarity select switch 94 for selecting positive- or negative-going flaws to an amplifier 92 whose output is fed to a comparator 96. The threshold level of the comparator 96 is provided by a threshold-set potentiometer 100 which is applied to the comparator 96 through a transistor 104. The output of the comparator 96 is applied to an inverter transistor 98 whose output provides a digital flaw amplitude signal which is then applied to the multiple scan memory flaw quantizer 110 shown on FIG. 12. The flaw amplitude discriminator circuit 90 also includes a feedback path 105 from the flaw quantizer 110, transistors 102 and 106 whose functions will be described later.

Figure 12:
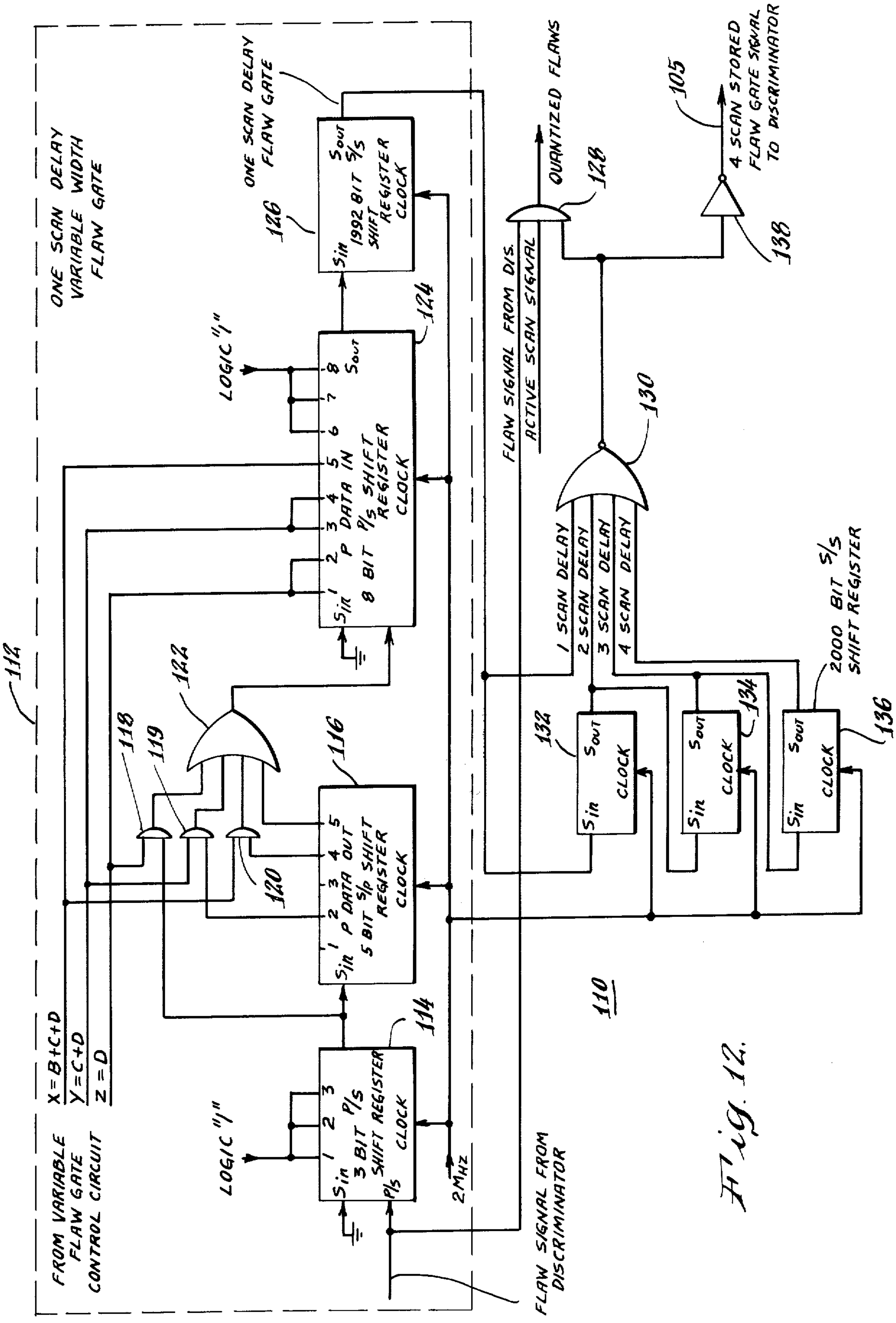
FIG. 12 is a block diagram of the multiple scan memory flaw quantizer shown in FIG. 1.

The multiple scan memory flaw quantizer 110, as shown in block form on FIG. 1, is illustrated in FIG. 12.

The flaw quantizer 110 includes a 1-scan delay variable width flaw gate 112 which functions to set up predetermined interval flaw gates which vary in width as they move from one scan interval to another, as shown in FIG. 9. As previously stated, these flaw gates produce a guard band which leads and trails a flaw, the time width of the band varying as the scan moves from center toward the edge. The 1-scan delay variable flaw gate circuit 112 in the implementation shown includes four serially connected shift registers 114, 116, 124, and 126. Each of the shift registers is provided with clock pulses of 2 MHz from the master oscillator 42. Digital flaw signals from the flaw amplitude discriminator 90 are applied to the parallel-serial control input of shift register 114 which is a 3-bit parallel-to-serial shift register with the flaw pulse appearing at its output for the duration of 3 clock pulses longer than the actual flaw pulse duration. This in effect stretches the time duration of a flaw signal by a fixed 1.5 microseconds. The output of shift register 114 is applied to an AND gate 118 and to the shift register 116. The shift register 116 is a 5-bit serial-to-parallel shift register having outputs from the data-out terminals 2, 4, and 5 which are applied to AND gates 119, 120, and OR gate 122, respectively. X, Y, and Z outputs from the variable flaw gate control circuit 70 are applied to gates 120, 119, and 118, respectively. The output of the OR gate 122 provides flaw pulse signals having a leading edge which is delayed after the leading edge of the flaw signal by 2.5, 2.0, 1.0 or 0 microseconds during the A, B, C, and D intervals shown on FIG. 9. The trailing edge of the flaw pulse produced at the output of the OR gate 122 is delayed by 4 microseconds after the trailing edge of the flaw signal applied thereto. The varying leading edge delayed and fixed trailing edge delayed flaw pulses from OR gate 122 are coupled to the parallel-serial control input of shift register 124, which is an 8-bit parallel-to-serial shift register with the parallel in-data coupled to the X, Y, and Z outputs as shown from the variable flaw gate control circuit 70. The output of shift register 124 provides flaw pulse signals whose leading edges are delayed after the leading edge of a flaw signal by 2.5, 2.0, 1.0, or 0 microseconds during the A, B, C, and D scan intervals, respectively. The trailing edge of the flaw pulse is delayed by 5.5, 6.0, 7.0 or 8.0 microseconds during the A, B, C, and D intervals, respectively. The output of the shift register 124 is applied to shift register 126 which is a 1,992-bit serial-to-serial shift register which functions to provide a 1-scan delay flaw gate with the flaw gate having leading and trailing edges symmetrically around the flaw signal, but delayed by 1 scan. The flaw gate is longer than the flaw signal by 3.0, 4.0, 6.0 and 8.0 microseconds during scan intervals A, B, C, and D respectively. This output corresponds precisely to that prescribed by the scan-time/scan-position graph shown in FIG. 9. The gates produce a guard band leading and trailing a flaw pulse. This band is varied across the scan in accordance with the position of the scan. The output of the 1-scan delay variable width flaw gate 126 is applied to a NOR-gate 130 and to a 2,000-bit serial-to-serial shift register 132. The output of the shift register 132 provides a 2-scan delay which is applied to the NOR gate 130 and to the input of another 2,000-bit serial-to-serial shift register 134. The output from the shift register 134 provides a 3-scan delay which is applied to the NOR gate 130 and to the input of another 2,000-bit serial-to-serial shift register 136. The output of the shift register 136 provides a 4-scan delay which is applied to the NOR gate 130. Any number of additional scans may be provided by merely adding more shift registers such as shift registers 132, 134 and 136.

The flaw quantizer 110 also includes a flaw gate 128 which receives flaw signals from the discriminator 90 and active scan signals from the variable flaw gate control circuit 70. When a flaw first occurs during an active scan period, no flaw gates will be present at any input of NOR gate 130, so the flaw pulse will transfer through AND gate 128, and may be applied to a counter 140, as shown in FIG. 1. On the subsequent four scans, logic 0 outputs from NOR gate 130 will inhibit AND gate 128 if the same flow occurs in the same position on the subsequent four scans. Of course, new flaws occurring in different positions on the materials 20 during active scan intervals will be passed on any initial scan of that new flaw in a new position. But it, too, will be inhibited for four scans following its disappearance before the flaw gate 128 is enabled to allow counting a new flaw in the same position. The output of the NOR gate 130 is also fed to an inverter 138 and subsequently to the discriminator 90 shown on FIG. 11 via feedback line 105. Referring again to FIG. 11, the feedback line 105 carrying the four-scan stored flaw gate signal from the quantizer 110 is applied to a transistor 102 which turns off transistor 104 and turns on transistor 106. The effect of this is to lower the threshold voltage on the comparator 96 to a level slightly above the background signal level of the system. In other words, a lower level threshold is established at the comparator 96 during flaw gate intervals one scan after detecting flaws, and the lower threshold is maintained until four sequential scans are completed after flaws are no longer present. This provides "scan line to scan line" hysteresis at scan positions where flaws are detected and flaw gates are formed. Once a flaw has been counted, during subsequent rescans of the same flow, beam jitter and other system irregularities could cause the flaw to produce lesser amplitude signals than it did on its original occurrence. Consequently, the flaw signal may not exceed the threshold level of the comparator if it was not reduced. Reducing the discriminator threshold insures that the quantizer will not miss a flaw signal generated from the same flaw on subsequent scans, even though the flaw signal is at a lower level. If will further insure that four scans must occur without the reappearance of the flaw signal at a minimum amplitude level before a new flaw at a higher amplitude level can be counted at the same position along the scan.

The counter 140 which receives the quantized flaws can be set at a predetermined number for providing an alarm or can be connected to a printer to record the number of quantized flaws. In some quality control operations, after a predetermined number of flaws are counted which exceeds the quality control standards, an alarm is desired.

It should be noted that the various features of the present invention may be utilized regardless of the type of scanning employed, e.g., sinusoidal or linear. The multiple scan memory quantizer may be utilized with either fixed or variable flaw gates, the variable flaw gates being desirable for non-linear scanning applications. The same is true of the lowering of the amplitude level of the flaw discriminator wherever a flaw gate signal is present whether the flaw gate is fixed or variable. In addition, the technique is applicable for signal as well as multiple stored scan line flaw gates. The variable width flaw gates are only useful to correct for varying scan velocity and would not be necessary for a linear type scan. Obtaining the center position of scan instead of deriving position information from any other point on the scan is mainly useful with scans that move back and forth across the center of the scan. The scanner or receiver optics are applicable to any type of scanning.

The system which has been described offers a number of advantages over previous systems. Although the functions outlined may be performed with different types of scan, the center-to-side active scan which is disclosed offers advantages in simply being able to provide position information using a single center pickup assembly which is accurate and simple to align. The center-to-side active scanning which is illustrated also provides total coverage of the surface scanned. Other scanning techniques such as left-to-right active scanning also achieve total coverage. However, using center-to-side active scan permits overscanning across the edges of material that may be narrower than the scan width. Any AC transient signal effects produced in going off and then back on the sheet of scanned material have time to die out before the center position of the scan is reached and the active scan portion started again. Thus, flaws close to the edges of the moving web will still produce proper signals prior to the scan traversing either the left or right edges of the material, and even small flaws will always be detected. The simple accurate center pickup provides an easy means to obtain scan position information to implement center-to-side active scanning with non-complex processing circuitry.

The scanner and receiver optics are designed to image the galvanometer mirror on the photomultiplier detector. The receiver optics are designed to give higher laser light collection efficiency while limiting the receiver field of view so the effects of ambient light are minimized. Prior systems have dealt with this problem using elaborate hood structures which had to be located to the inspection surface, whereas with the receiver optics, the need for close proximity is eliminated. Light from a point on the surface of the material being examined is uniformly distributed across the entire photomultiplier tube face. This feature eliminates problems that could result if the photomultiplier surface sensitivity were non-uniform and if different areas of the scanned material were imaged on different portions of the tube face. The optics also adapt themselves to simple alignment procedures.

In the electronic processing, the flaw quantizer includes a multiple scan memory in which the same flaws are not counted unless they disappear for a predetermined number of successive scans. A signal is also fed back from the flaw quantizer to the flaw amplitude discriminator which in effect lowers the amplitude of the discriminator threshold on subsequent scans so that the flaw will still be detected even though a reduced amplitude signal occurs when the same flaw is scanned on subsequent lines. This produces "scan-to-scan hysteresis" eliminating problems due to beam jitter which causes the same flaw to produce different amplitude signals on different scans. The multiple scan memory flaw quantizer is also provided with a variable width flaw gate. The gates near the center of the scan are shorter in time duration than those on the outer edges of the scan to compensate for the fact that the beam travels much faster in the center than it does at the edges. This solves the problem of counting the same flaws twice on subsequent scans, or missing new flaws on subsequent scans because of prior art systems using fixed time intervals across the entire scan.

Although the electronic portions of the system shown in FIG. 1 is explained with respect to the use of a center pickup for providing scan position information, and is preferred because of its simple implementation, it will be apparent that other types of scan can be utilized with the circuitry shown for providing the variable width flaw gate control circuit, the flaw amplitude discriminator and the multiple scan memory flaw quantizer as long as means are provided for providing scan position information.

Since other modifications and changes, varied to fit particular operating requirements and environments, will be apparent to those skilled in the art, this invention is not considered limited to the examples chosen for purposes of disclosure, and covers all changes and modifications which do not constitute departures from the true spirit and scope of this invention.

We claim:

1. A laser scanner flaw detection system for detecting flaws on a surface of material, comprising a. a laser for emitting a laser beam of radiation, b. scanner means for successively scanning said laser beam across a surface of material being examined, c. receiver means having a field of view and a detector means for receiving radiation applied by said laser beam from said surface to said detector means producing, signals therefrom in response to the radiation applied to said detector means, d. flaw amplitude discriminator means coupled to said detector means for producing flaw signals therefrom when the signals from said detector means exceed a predetermined level, e. laser beam position indicating means for producing beam position signals, f. variable flaw gate control means having said beam position signals coupled thereto for providing variable flaw gate control signals which vary in accordance with the scan position of said laser beam, g. one-scan delay variable width flaw gate means having said flaw signals from said discriminator and said flaw gate control signals coupled thereto for providing one-scan delay variable time width flaw gate signals which vary in accordance with the scan position of said laser beam, and h. flaw quantizer means coupled to said flaw amplitude discriminator and said one-scan delay variable width flaw gate means for passing an output indicative of a flaw on the surface of the material being examined only on the first occurrence of a flaw signal during an active scan interval, and inhibiting subsequent flaws signals occurring during adjacent successive scans which occur during the time intervals of the flaw gates established by said one-scan delay variable width flaw gate means.

2. The laser scanner flaw detection system set forth in claim 1 wherein said flaw quantizer means includes a multiple line scan memory delay means for inhibiting any output from flaw signals produced by the flaws which occur during a given flaw gate until the flaw signal which produced such flaw gate disappears for a predetermined number of subsequent multiple line scans.

3. The laser scanner flaw detection system set forth in claim 2 wherein said multiple line scan memory delay means provides variable time width flaw gate signals with feedback means coupling said multiple line scan memory delay means to said flaw amplitude discriminator means for lowering said predetermined level during the occurrence of said variable time width flaw gate signals.

4. The structure set forth in claim 1 having feedback means coupled between said flaw quantizer and said discriminator means for feeding back said one-scan delay variable time width flaw gate signals to said discriminator which lowers the said predetermined level of said discriminator when said flaw gate signals are present.

5. The laser scanner flaw detection system set forth in claim 1 wherein said laser beam has a center position on the surface of material being scanned by said scanner means, said laser beam position means comprising a center pickup assembly for generating a center pickup signal when said laser beam crosses the center position of its scan across the surface of material being examined.

6. The structure set forth in claim 5 wherein said center pickup assembly comprises a partially reflective window in the path of said laser beam, a focusing lens, an opaque mask with an opening therein aligned with the center position of the laser beam during the scanning thereof, and detector means, said focusing lens imaging the center position of said laser beam reflected from said window onto said mask opening with light therefrom being applied to said detector means for producing a center pickup signal output from said detector means.

7. The structure set forth in claim 1 wherein said variable flaw gate control means includes active scan defining means for producing active scan position signals only when the laser beam is moving from center either side across the surface of material being examined on each scan interval.

8. The structure set forth in claim 1 wherein said scanner means includes a. a galvanometer mirror driven by a high speed galvanometer for scanning said laser beam across the surface of the material being examined, b. a pair of cylindrical focusing lenses with their optical axes being orthogonal to each other for adjusting the spot size on the material surface from said laser beam in width and length parallel to and perpendicular to the direction of scan of said laser beam, and c. a spherical lens positioned between said galvanometer mirror and said pair of cylindrical lenses at a distance from said galvanometer mirror equal to its focal length for imaging light passing through said cylindrical focusing lenses via said galvanometer mirror onto the surface of the material being examined.

9. The structure set forth in claim 1 wherein said detector means comprises a photomultiplier tube having a face thereon and said receiver means includes receiver optical means for collecting light from the scanning laser beam spot on said surface of material and spreading said light across the face of said photomultiplier tube for eliminating changes of flaw signal amplitude due to differences in sensitivity across the face of said photomultiplier tube and changes of angles between the scanning laser beam, material surface, and photomultiplier tube.

10. The structures set forth in claim 9 wherein said receiver optical means comprises a. a combination of lenses having a pair of back-to-back Fresnel lenses and a first cylindrical lens, said combination of lenses having different focal lengths with respect to axes perpendicular and parallel to a scan line scanned by said laser beam on said surface of material being examined, and b. a second cylindrical lens having a mask with an opening therein for determining the receiver field of view in a direction perpendicular to said scan line, c. said combination of lenses being positioned in a plane with respect to said scanning means, said photomultiplier tube, and said scan line, such that said scanning means is imaged on said photomultiplier tube, and d. said second cylindrical lens being positioned with respect to said combination of lenses and said photomultiplier tube for imaging said combination of lenses on said photomultiplier tube in a direction perpendicular to said scan line, said combination of lenses imaging said scan line onto said opening in said opaque mask of said second cylindrical lens.

11. The structure set forth in claim 10 wherein the distances from said scanning means to said scan line and from said scan line to said receiver remain the same, with said receiver means and said scanner means being located in different planes.

12. A laser scanner flaw detection system for detecting flaws on a surface of material comprising a. a laser for emitting a laser beam of radiation, b. scanner means for successively scanning said laser beam across the surface of material being examined, said laser beam having a predetermined scan path including a center position on said surface of material, c. center position means for generating a center position signal whenever said scanning laser beam is at said center position on the surface of material being examined, d. active scan position indicator means having said center position signal coupled thereto for producing an active scan output signal only during scanning intervals of the laser beam from center to side in either direction on the material being examined, e. receiver means having a detector means for receiving radiation applied by said laser beam from said surface to said detector means producing a flaw signal therefrom in response to the radiation applied to said detector means, f. flaw amplitude discriminator means coupled to said detector means for producing flaw signal outputs therefrom when the flaw signals from said detector means exceed a predetermined level, and g. gating means having inputs from said flaw amplitude discriminator means and said active scan position indicator means coupled thereto for passing flaw signals of predetermined amplitude only during active scan intervals from center to side on each scan of the material being examined.

13. The structure set forth in claim 12 wherein said center position means comprises a partially reflective window positioned in the scan path of said laser beam, a focusing lens, an opaque mask with an opening therein aligned with said center position of the laser beam during the scanning thereof and detector means, said focusing lens imaging said center position of said laser beam reflected from said window onto said mask opening with light therefrom being applied to said detector means for producing a center pickup signal output from said detector means.

14. A laser scanner flaw detection system for detecting flaws on a surface of material, comprising a. a laser for emitting a laser beam of radiation having a spot size,
b. scanner means for successively scanning said laser beam across a surface of material being examined,
c. said scanner means including a pair of cylindrical focusing lenses with their cylindrical axes being orthogonal to each other for adjusting said spot size on the material surface from said laser beam in width and length parallel and perpendicular to the direction of scan of said laser beam, and a spherical lens positioned between said scanning means and said pair of cylindrical lenses at a distance from said scanning means equal to its focal length for imaging laser light passing through said cylindrical focusing lenses via said scanning means onto the surface of the material being examined,
d. receiver means having a detector means for receiving radiation applied by said laser beam from said surface to said detector means producing signals therefrom in response to the radiation applied to said detector means, and
e. flaw amplitude discriminator means coupled to said detector means for producing flaw output signals when said signals from said detector means exceed a predetermined level.

15. The structure set forth in claim 14 wherein said detector means comprises a photomultiplier tube having a face thereon and said receiver means includes receiver optical means for collecting light from said laser beam on said surface of material and spreading said light across said face of said photomultiplier tube for eliminating changes of flaw signal amplitude due to differences in sensitivity across the face of said photomultiplier tube and changes of angles between the scanning laser beam, material surface, and photomultiplier tube.

16. A laser scanner flaw detection system for detecting flaws on a surface of material, comprising a. a laser for emitting a laser beam of radiation,
b. scanner means for successively scanning said laser beam across a surface of material being examined,
c. receiver means having a field of view, receiver optical means, and a detector means for receiving radiation applied from said surface to said detector means producing signals therefrom in response to the radiation applied thereto,
d. said receiver optical means comprising a combination of lenses having a pair of back-to-back Fresnel lenses and a first cylindrical lens, said combination of lenses having different focal lengths with respect to axes perpendicular and parallel to a scan line scanned by said laser beam on said surface of material being examined, and a second cylindrical lens having a mask with an opening therein for determining the receiver field of view in a direction perpendicular to said scan line,
e. said combination of lenses being positioned in a plane with respect to said scanning means, said detector means and said scan line such that said scanning means is imaged on said detector means,
f. said second cylindrical lens being positioned with respect to said combination of lenses and said detector means for imaging said combination of lenses on said detector means in a direction perpendicular to said scan line, said combination of lenses imaging said scan line onto said opening in said opaque mask of said second cylindrical lens, and
g. flaw amplitude discriminator means coupled to said detector means for producing flaw signal outputs therefrom when said signals from said detector means exceed a predetermined level.

17. The structure set forth in claim 16 wherein the distances from said scanning means to said scan line and from said scan line to said receiver remain the same, with said receiver means and said scanning means being located in different planes.

18. The structure set forth in claim 16 wherein said receiver optical means includes a lamp and a fold-down mirror when in fold-down position images said lamp through said receiver optical means for showing the surface of material being scanned from which light will produce output signals from said detector means.

19. A laser scanner flaw detection system for detecting flaws on a surface of material, comprising a. a laser for emitting a laser beam of radiation,
b. scanner means for successively scanning said laser beam across a surface of material being examined,
c. receiver means having a detector means for receiving radiation applied by said laser beam from said surface to said detector means producing signals therefrom in response to the radiation applied to said detector means,
d. flaw amplitude discriminator means coupled to said detector means for producing a flaw output signal indicative of a flaw occurring on the surface of material being examined when said signals from said detector means exceed a predetermined level,
e. one-scan delay flaw gate means for generating flaw gate signals which surround said flaw output signal on the next scan line, and
f. multiple line scan memory flaw quantizer means having said flaw gate signals coupled thereto and having an input connected to the output of said flaw amplitude discriminator means for producing an output indicative of a flaw only on the first occurrence during a scan interval and preventing an output for a flaw located in the same position during a predetermined number of subsequent multiple line scans.

20. The structure set forth in claim 19 including feedback means coupled between said multiple line scan memory flaw quantizer means and said flaw amplitude discriminator for dropping the predetermined level of said flaw amplitude discriminator for a predetermined number of subsequent multiple line scans after a flaw signal is passed, thereby to insure that the same flaw represented by said flaw signal disappears for a predetermined number of multiple line scans before a new flaw which occurs at the same position on said surface of material is passed by said quantizer.

21. A laser scanner flaw detection system for detecting flaws on a surface of material, comprising a. a laser for emitting a laser beam of radiation, b. scanner means for successively scanning said laser beam across a surface of material being examined, forming a plurality of successive scan lines thereon, c. receiver means having a detector means for receiving radiation applied by said laser beam from said surface to said detector means producing a flaw signal therefrom in response to the intensity of radiation applied to said detector means, d. flaw amplitude discriminator means coupled to said detector means for producing a flaw output signal indicative of a flaw occurring at a position along one of said scan lines when the flaw signals from said detector means exceed a predetermined level, e. one-scan delay flaw gate means for generating flaw gate signals which surround said flaw on the next scan line, f. flaw quantizer means having the output of said flaw amplitude discriminator means and said flaw gate signals coupled thereto for producing an output indicative of said flaw during said one of said scan lines and preventing an output for said flaw located in the same position during a subsequent scan line, and g. feedback means coupling said flaw gate signals from said flaw quantizer means to said amplitude discriminator means for dropping said predetermined level of said flaw amplitude discriminator for at least a subsequent scan line to insure said flaw disappears for at least one scan line before a new flaw is passed in the same position by said quantizer.

* * * * *